March 21, 1961  C. OCKER  2,976,008
VALVE STRUCTURE
Filed May 3, 1957  3 Sheets-Sheet 1

INVENTOR
Charles Ocker
BY
ATTORNEYS

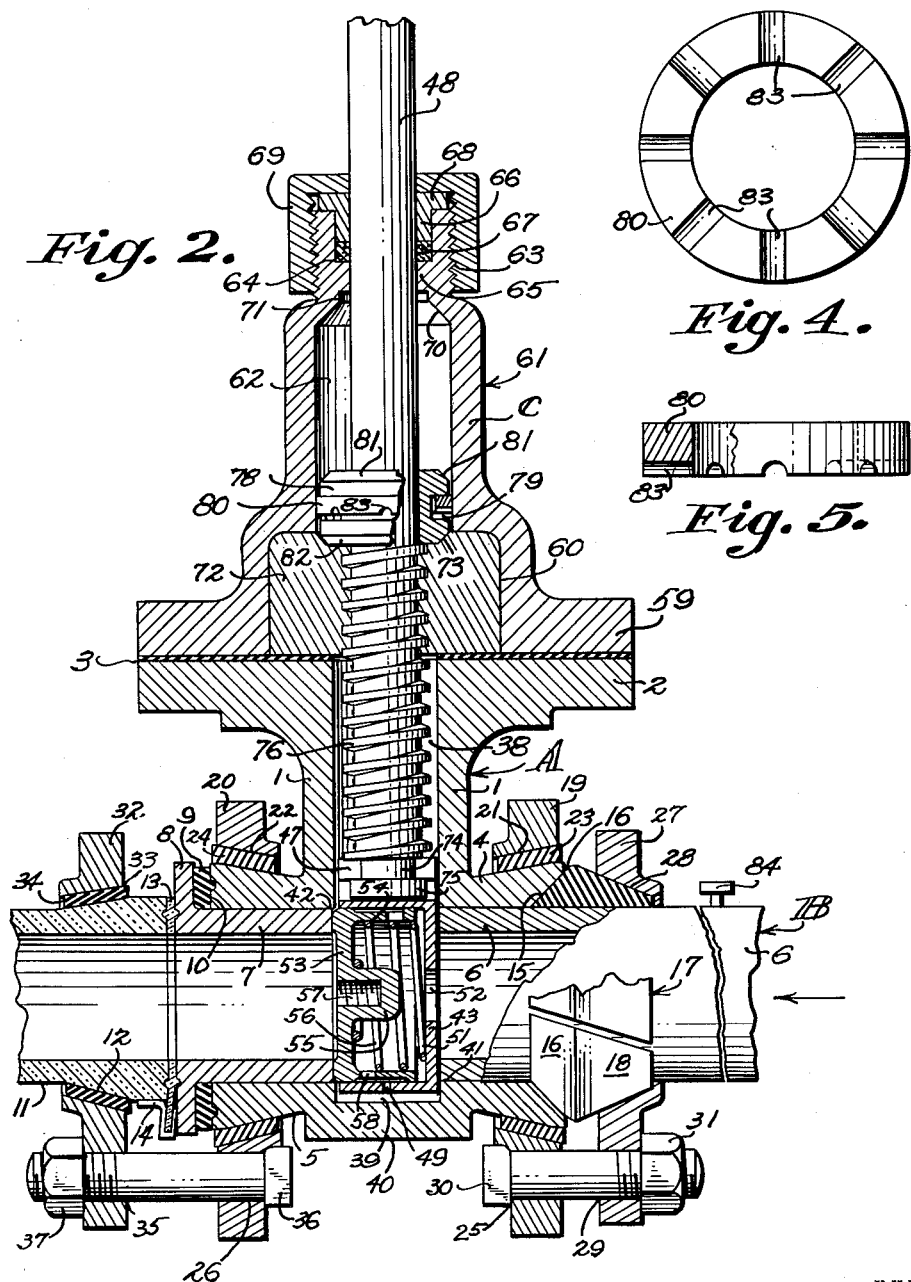

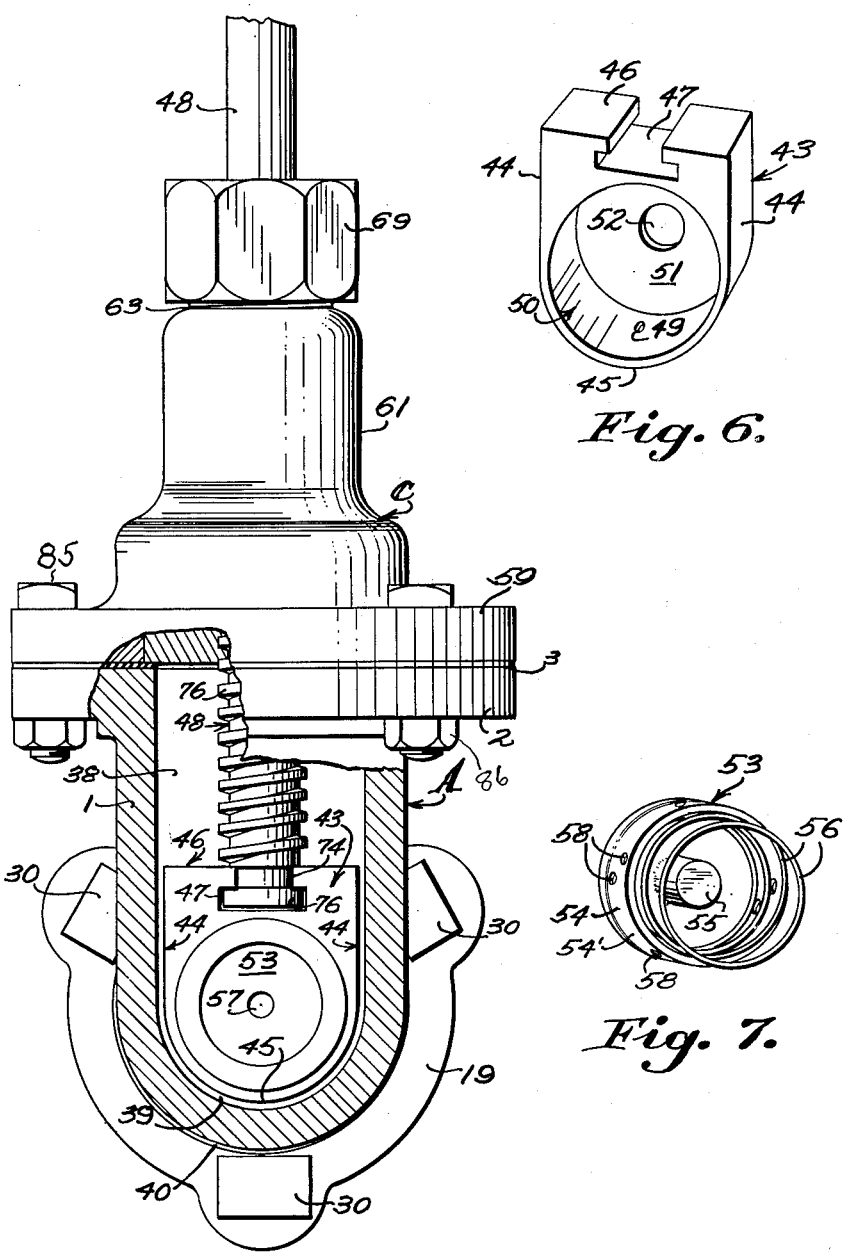

United States Patent Office 2,976,008
Patented Mar. 21, 1961

2,976,008

VALVE STRUCTURE

Charles Ocker, 914 Magnolia St.,
New Smyrna Beach, Fla.

Filed May 3, 1957, Ser. No. 656,950

4 Claims. (Cl. 251—175)

The invention relates to a valve structure for use in connection with all types of pipelines adapted to transport fluid under pressure such as chemicals, oils, gas, water, steam and the like.

The instant invention embodies improvements on my Patent No. 2,668,685, February 9, 1954, Blowoff Valves for Locomotive Boilers.

Though the above referred to patented device has proven eminently successful and represents a distinct advance in the art, its further development was necessary to effect its adaptation, as a non-stickable valve, in connection with all types of pipelines.

It is a well established fact that the use of steam and fluid control valves for pipelines operating under high steam and fluid pressures, are susceptible to becoming stuck by reason of the tendency of moving parts to stick under fluid pressure thereby disrupting operation and often causing a shutdown of the facility.

Therefore, one of the principal objects of the invention is the provision of a valve structure mounted in a pipeline having connection with a source of fluid under pressure, comprising a one-piece body fluid passage portion having aligned fluid inlet and outlet openings and fluid passage portions, and an integral valve chamber portion projecting beyond opposite sides of the fluid passage portion extending at right angles to the axis of the fluid passage, and terminating at its upper end in a flange portion providing a flat face at right angles to the valve chamber.

A further important object of this invention is the provision of a fluid control valve structure of this character comprising a body portion having a valve chamber extending substantially throughout its length, integral fluid inlet and outlet passage portions extending from opposite sides of said chamber and effecting therewith a continuous fluid passage at right angles to said body-portion adjacent to its lower end, a valve structure comprising a hollow open-faced apertured flat sided valve block member including a movable spring controlled valve element therein normally closing the open face of said block when the valve block is slidably mounted in said valve chamber, and means for effecting equilization of the fluid pressure within the chamber with respect to said valve block and its movable valve element to effect the free and easy operation thereof in said chamber to valve open and closed positions and prevent sticking of said parts especially in closed position.

Still another important object of this invention is the operative arrangement of the valve block, so that it is suspended in valve open and closed positions in the chamber to prevent sticking especially in closed position.

Another important object of this invention is the provision of a valve structure comprising a fluid passage portion adapted to be placed in a fluid pipe-line, the size of said passage corresponding to that of the pipeline, and projecting upwardly from the fluid passage portion at right angles to the axis thereof is a valve chamber extending from a point slightly below the bottom of the passage to the upper end of the valve structure which latter terminates in an integral lateral flange. Mounted in said chamber normally in said fluid passage is a bottom apertured valve block member having a flat apertured fluid inlet facing side, an oppositely facing resiliently mounted valve element movably mounted in said block, an annular member on the fluid outlet side constituting a seat for said resiliently mounted valve element and removable to permit removal and replacement of the resiliently mounted valve element, valve stem means for moving said valve to and from passage opening and closing positions, and means in connection with said valve block for equalizing the fluid pressure thereon to effect non-stick operation of said valve in said chamber.

Still another object of this invention is the provision of a valve body structure of this character having a lateral flange coincident with its upper end and at its lower end a pressure fluid passage adapted to be mounted as a section in a pipeline, and having a valve chamber intersecting said fluid passage and extending at right angles to the axis of said fluid passage and beyond the confines of said passage, a valve block slidable in said chamber, said block including a movable spring controlled auxiliary valve mounted therein, means in connection with said valve block and its auxiliary valve for equalizing the fluid pressure thereon to effect easy operation of said block in valve opening direction without sticking of said block, and a bonnet structure including a manually operated valve stem removably connected to said valve, said bonnet structure terminating at its lower end in a lateral annular flange forming with said lower end a flat bottom surface adapted to seat on and be removably connected to the corresponding flat top flange surface of the valve body structure.

Another important object of this invention is the provision of a valve structure of this character including an elongated chamber having aligned inlet and outlet passage portions adjacent to its lower rounded end and adapted to be mounted in a pipeline, a gate valve block adapted to operate under fluid pressures, said valve block rounded and apertured at its lower end and flat at its upper end slidable in said chamber, said rounded end adapted to extend practically to the lower end of said chamber below said fluid passage when in valve closing position and to be disposed an equal distance above said fluid passage when the valve block is in completely open position to provide a pocket in communication with the interior of said valve chamber, the upper flat end of said valve block being formed with means to receive the lower end of a valve stem for moving said valve block into and out of fluid passage closing position, said valve block having a cavity therein facing in fluid outlet direction and with a flat side wall facing in fluid inlet directon and formed with a centrally disposed fluid inlet aperture, a disc-like movable valve member having a cylindrical peripheral flange or tubular portion seating in said cavity and having no direct connection with the valve block, spring means in said tubular portion for maintaining said valve in sealing position with respect to the outlet, and additional means in connection with said valve block and said movable valve to effect equalization of the fluid pressure on said block when in fluid passage closing position to render it floatingly movable to passage open position.

Still another important object of this invention is the provision of a valve body structure of this character comprising an elongated valve chamber extending substantially throughout its length, aligned opposite pressure fluid inlet and outlet passage portions in communication with said chamber and providing with said chamber a continuous pipeline fluid pressure passage section, a valve block structure in said chamber including a movable valve therein, means in connection with said block and movable valve to effect equalization of said fluid pressure in said chamber and on said block to prevent sticking thereof, a bonnet structure having an annular base portion adapted to fit on and be connected to the upper end of said valve body structure, a central annular cavity in said base, a centrally threaded nut in said cavity, a cylindrical portion forming a piston chamber extending upwardly from said cavity, formed with upper and lower piston valve seats and having a reduced annular threaded portion forming a valve stem or piston rod packing chamber, the bottom of which constitutes the top of the piston chamber, a packing ring projecting into said chamber and having an extended top adapted to seat on the threaded portion, and a hexagonal cap member mounted on the threaded portion, a threaded valve stem detachably connected to said valve block, and threadedly engageable in said nut, said valve stem extending upwardly through the piston chamber and beyond the said cap and on the free end of which is fixedly secured an operating hand wheel, fixedly mounted on said stem in the piston chamber is a piston formed with an annular channel in which is loosely mounted a centrally oversized snapring vertically movable in said channel, grooved on its bottom face and having a snap fit on the chamber wall, the piston having oppositely beveled faces for sealing engagement with the top and bottom piston valve seats when the valve block is in complete open and closed positions, and on the upward stroke the ring will engage the lower channel wall and owing to the central loose valve stem ring fit and the bottom ring grooves, any chamber content will be ejected into the piston cylinder beneath the piston whereupon the valve block will move to open position without any resistance during the upward movement of the piston in its chamber. Also, when the valve block is in wide open position under pipeline fluid pressure, on the downward stroke the piston ring will engage the upper channel face creating a seal, so that the pipeline contents may be ejected from the piston chamber and into the valve block chamber through the threaded area of the guide nut and valve stem during the downward stroke, sealing the chamber free from pipeline contents, leaving no service for the valve stem packing to render at any time, other than when the piston is disengaged from the top or bottom valve seats, and therefore the valve stem packing may be renewed whenever the valve is either in complete open or closed position, without requiring any interruption to the operation of the pipeline.

Another important object of this invention is the provision of a valve body of this character including an elongated chamber having aligned inlet and outlet pressure fluid passage portions adjacent to its lower end adapted to be mounted in a pipeline, a slidable gate valve block adapted to operate under high fluid pressures having an apertured inlet side, a rounded and apertured lower end and a flat upper end which is formed with a valve stem connecting means, an outlet facing cavity in said block, a movable disc-like valve member formed with a peripheral annular flange seating in said cavity with a spring therein for maintaining said valve in sealing position with respect to said outlet passage, means mounted in the outlet passage forming a removable seat for said disc valve, thereby permitting the removal of said valve and replacement thereof or with a new one without disturbing the closed position of said valve block, the annular flange of the movable valve being formed with a channel provided with series of staggered perforations, the construction of the valve block, movable valve, and their perforate construction being such as to effect equalization of fluid pressure within the valve chamber and with respect to the valve block to impart floating characteristics to the valve block in said chamber.

A further important object of this invention is the provision of a valve body structure of this character comprising an elongated chamber extending substantially throughout its length, aligned opposite pressure fluid inlet and outlet outwardly flared passage portions communicating with said chamber and effecting with said chamber a continuous pipeline pressure fluid passage section extending at right angles to the axis of said body structure, a valve block slidable in said chamber and including an outlet facing cavity, a movable valve member seating in said cavity, spring means in said valve member for maintaining said outlet passage closed, additional means for supplementing the action of said spring, said additional means including a source of fluid under pressure, and means for directing said fluid under pressure into said movable valve and at different points therefrom into said block cavity and therefrom into said chamber tending to raise said block and effect floating thereof for easy reciprocation, and means for mounting said valve body structure in a pipeline and rigidly securing it in operative position, comprising a pair of clamping rings on each side of said body, one ring of the pair being complementally mounted on a packing ring seating on the outwardly inclined flared surface of the integral inlet pressure fluid passage portion, the outer smaller ring complementally mounted on an opposite downwardly inclined surface of a thickened split packing ring mounted directly on the inlet section 6 of the pipeline B, said rings being drawn in tightening direction by their coupling bolts, and a similar pair of clamping rings are on the outlet side of said body structure, except having their gripping surfaces oppositely inclined complementally to the oppositely flared base surfaces, except there is a joint at the end of the pipeline section 11, so that removal of the valve seat member can be effected, and in the present instance, this pipe section is constructed of glass outwardly flared at its connecting end and on which is complementally mounted the outer clamping ring coupled to its companion ring by bolts similar to the rings hereinbefore described. The tightening of the rings on the outlet side of the body structure not only completes the rigid mounting of the valve body with respect to the pipeline, but at the same time effects a non-leakable jointure between the body structure and the pipeline section.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Fig. 2 is a vertical section of the valve, showing parts broken away.

Fig. 3 is a vertical section taken on the line 3—3 of Fig. 1.

Fig. 4 is a bottom plan view of the piston ring for the bonnet chamber.

Fig. 5 is a side elevation of the piston ring broken away and in section.

Fig. 6 is a perspective view of the valve block with the disk valve removed.

Fig. 7 is a perspective view of the disc valve and spring.

Figure 1:
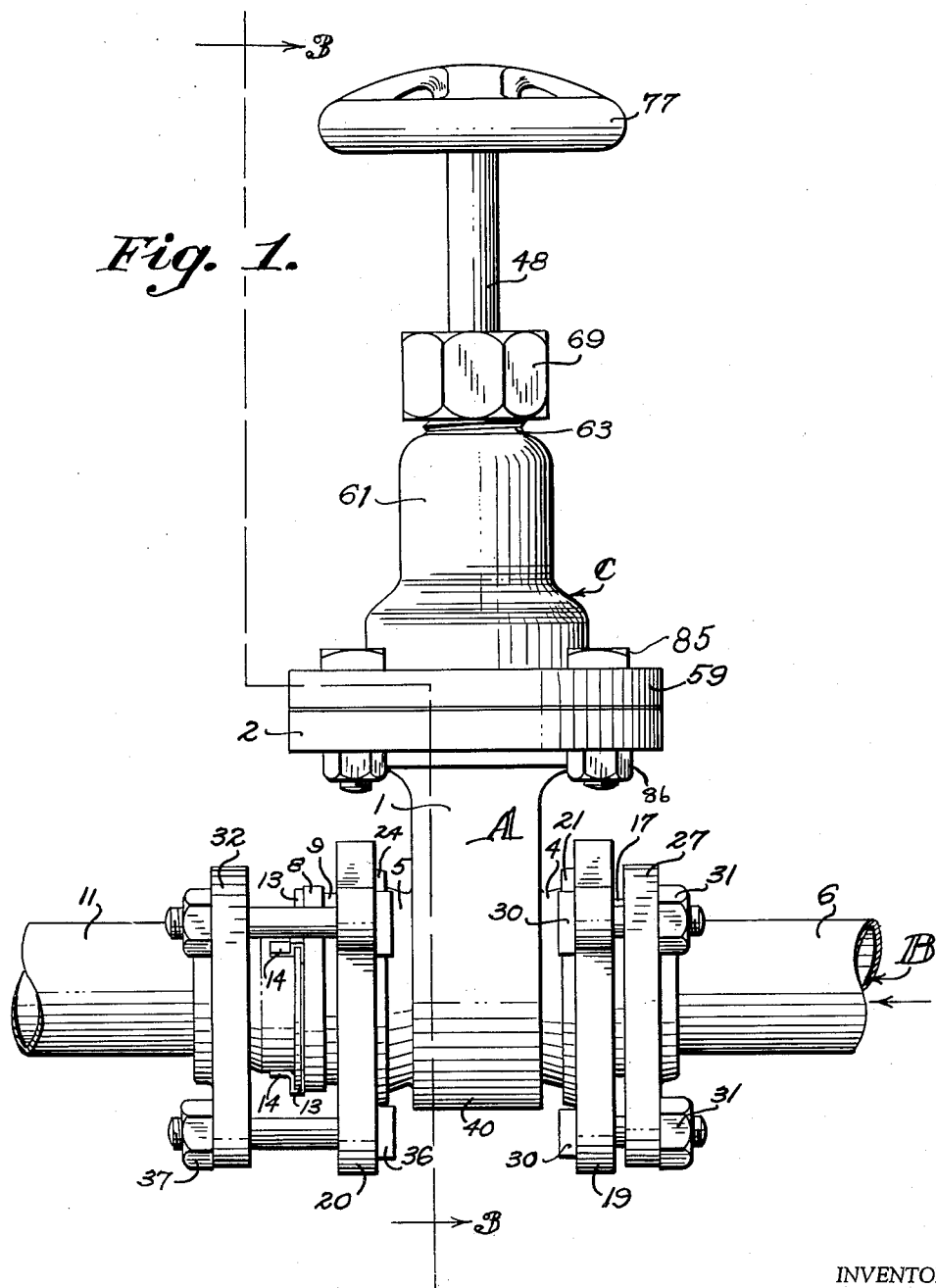
Fig. 1 is a side elevation of the valve operatively mounted in a pipeline.

In the illustrated embodiment characterizing this invention there is shown a valve body structure A, adapted to be mounted in a fluid pipeline B, and surmounting and attached to the valve body structure A is a unique bonnet structure C.

The integral valve body structure A is formed with a stem portion 1 having a thickened annular lateral flange-like top portion 2 terminating in a flat surface 3. Said stem 1 at its lower end is formed with integral right angular oppositely projecting outwardly flared pressure fluid passage portions 4 and 5. The pressure fluid inlet passage portion 4 is mounted on the end of a fluid supply inlet pipe 6, and the opposite similar outwardly flared passage portion 5 is adapted to receive the tubular removable valve seat member 7, of the same bore as the aligned fluid inlet pipe 6, and which is formed at its outer end with a lateral flange 8 engaging the packing 9 on the flat end 10 of the flared portion 5. The pressure fluid outlet pipe 11 section of pipeline B corresponds to the aligned pressure fluid inlet pipe 6 of the pipeline B, except in the present instance, for illustrative purposes, it is shown as made of chemical and oil resistant substance such as glass (Fig. 2.). Pipe 11 is flared at its connecting end as at 12, similar to the flared portion 5, and in order to cushion somewhat the end of pipe 11 and effect a non-leak joint there is provided a washer-like member 13 of pliable chemical resistant substance having an annular series of spaced laterally extending lugs 14 engageable over the end of said pipe 11 to hold it in aligning attachment with flange 8 of the removable valve seat member 7. The end of the flared extension 4 is provided with an undercut recess 15 adapted to receive the complementally inclined face 16 of the resilient split thickened packing ring 17 formed with an opposite downwardly inclined outer face 18 mounted on the fluid inlet pipe section 6 for a purpose directly more fully appearing.

The manner of securing the valve structure A in the fluid pipeline B will now be more fully described.

Mounted on the flared members 4 and 5 are similarly shaped adjustable clamping rings 19 and 20 formed with openings, the walls 21 and 22 of which, are complemental to the flared passage portions or members 4 and 5 and sufficiently spaced therefrom to seat on the split packing ring elements 23 and 24. The rings 19 and 20 have registering bolt openings 25 and 26. An adjustable clamping ring 27 substantially similar to ring 19, except the opening being slightly smaller than that of ring 19, and the inclined wall 28 of which is adapted to seat on the similarly inclined wall 18 of packing ring 17 and is formed with bolt openings 29. A series of bolts 30 extend through respective series of registering openings 25—29 and tightening of the nuts 31 on bolts 30 draw the rings upwardly in meeting direction on their opposed inclined seats thereby effecting the tightening and locking of the valve body structure A on the fluid inlet pipe 6. Mounted on the flared end 12 of outlet pipe 11 is the clamping ring 32 which with its complementally inclined wall 33 and packing 34 is similar to its coupled ring 20 except being smaller to properly seat on packing 34. The tightening or clamping rings 20 and 32 are provided with registering bolt openings 26 and 35 to receive the coupling bolts 36, which by tightening the nuts 37 thereon draws said rings in tightening direction and which with the coupled rings 19—27 effect a tight jointure with the pipes 6 and 11 and locks the valve body structure in operative position thereto.

The packing in connection with the mounting assembly of the body structure A on the pipeline B of the adjustable clamping rings, is, in the present instance, of the Chevron type.

The body A is provided with an elongated rectangular valve chamber 38 extending from surface 3 of the valve structure to and slightly below the pipe 6 and removable valve seat member 7 at right angles to the axis of the fluid passage B, the bottom of the said chamber as at 39 being rounded similar to the rounded end of structure A as at 40. The wall of said chamber on the inlet side is formed with an opening adapted to receive the end of pipe 6, but not to extend beyond the inner surface of the chamber wall as at 41 and a similar opening 42 is provided in the outlet wall of said chamber. Mounted in the valve chamber 38 intermediate said openings in fluid passage closing position is the valve block 43 having parallel sides 44, rounded at its lower end 45 in which is formed a fluid aperture, and flat at its upper end 46 in which is formed a bayonet slot 47 adapted to receive the end of valve stem 48 as directly more fully explained.

Said valve block has a fluid aperture 49 in its rounded end 45 and slidable by said valve stem into and out of pressure fluid blocking position in said chamber with respect to the inlet pipe 6, and said rounded apertured end 45 of said block is adapted to extend practically to the lower end 39 of said chamber below said pressure fluid passage B when in valve closing position, and oppositely above said passage when in valve open position to form a pocket in communication with the valve chamber 38, said valve block having a cavity 50 facing in fluid outlet direction and a flat side wall 51 facing in inlet direction and formed with a central inlet aperture 52.

A disc-like auxiliary movable valve member 53 having a lateral peripheral flange or tubular portion 54 and an annular channel 54' formed thereon and seating in said cavity 50, said valve having no direct connection with the valve block. Said movable valve 53 is formed with an inwardly projecting knob 55 and a compressible spring 56 is anchored within said flange to said knob for maintaining the valve in sealing position on valve seat member 7. Said knob 55 being internally threaded as at 57 (Figs. 2 and 3) to threadedly receive a tool to more readily effect replacing of a new disc valve under the action of the spring. In connection with chemicals, the spring 56 in the valve 53 should have a cover material applied thereto, such as Teflon. The cylindrical flange 54 of said valve is formed with staggered series of perforations 58, and when the valve block 43 is in valve closing position the aperture 52 permits the passage of pressure fluid to the block and within the cylindrical flange and through the staggered openings 58 in the movable auxiliary valve and through aperture 49 to valve chamber 38 and on opposite sides of said block to equalize the fluid pressure thereon and give a floating tendency to said block and thereby render easy slidable movement of the block in the chamber.

In connection with the aligning valve seat 7, disc valve member 53 and valve block 43, it will be observed that the disc valve rotates with respect to its seat each time the valve is operated, thereby keeping the engageable valve and its seats evenly worn, and which is augmented by the peripheral edges of members 7 and 53 being slightly rounded. This structural arrangement extends the life of the valve and lessens repairs.

The bonnet structure C is formed with an enlarged annular flange base portion 59 adapted to complementally seat on the surface 3 of the top portion 2 of structure A. An annular cavity 60 is formed in said base portion 59, and extending upwardly therefrom is a cylindrical portion 61 forming a piston chamber 62 in communication with the cavity 60, the upper end of said cylindrical portion 61 being formed with a reduced annular threaded portion 63 forming a valve stem or piston rod packing chamber 64 having an integral bottom portion 65 which constitutes the top surface of the piston chamber. A packing ring 66 projects into the packing chamber 64 and engages the packing material 67 therein, and has an extended top portion 68 seating on the end of the threaded portion 63, and an internally threaded hexagonal cap member 69 is adapted to engage over the top portion 63. The piston chamber 62 is formed at its upper end with an annular valve seat 70 at the lower edge of an annular recess 71. Mounted in the base cavity 60 is, in the present instance, a split internally threaded guide nut 72, which may not be split if desired, having formed in its upper surface a counter-sunk valve or piston seat 73 similar to valve seat 70.

The valve stem 48 is formed at its lower end with an annular groove 74 and a circular end piece 75 adapted for engagement in the bayonet slot 47 of the valve block 43. The threaded portion 76 of the said valve stem extends from its lower end through the threaded nut 72 in cavity 60 and to the bottom of the counter-sunk annular valve seat 73, said valve stem extending upwardly through the piston chamber 62, packing chamber 64, packing ring 66, cap 69 and on the free end of which is fixedly secured hand wheel 77 for actuating said valve block to open and closed positions. Fixedly mounted on said valve stem or piston rod is a piston 78 in which is formed an annular channel or groove 79 in which is mounted a snap-ring 80 having an oversized piston rod opening and adapted to snugly fit the chamber wall and having $\frac{1}{32}''$ vertical movement in said channel. The piston 78 may have more than one channel and ring if desired. Said piston is formed on its upper face with an annular inclined valve surface 81 adapted to sealingly engage the upper valve seat 70 in chamber 62 when moved upwardly to complete valve block open position, and is formed with a complemental lower surface 82 to sealingly engage the valve seat 73 when moved downwardly to valve closing position. Said ring 80 is formed on its under surface with a plurality of grooves 83.

Piston ring 80 projects beyond the surface of piston 78 into close frictional contact with the adjacent wall of piston chamber 62. Owing to this frictional contact piston ring 80 (which as previously pointed out may be vertically actuated $\frac{1}{32}''$ within its channel 79) will be moved into contact with the upper or bottom walls of channel 79, dependent upon the direction of piston movement within the piston cylinder or chamber 62, hence on the upward stroke of the piston, ring 80 will be moved downwardly, positioning its lower grooved surface of said ring into contact with the adjacent bottom wall of channel 79. With the piston ring in this position as the piston ascends its cylinder a bypass around the piston will be provided defined by the clearance between the upper portion of piston 78 and the adjacent surface of piston cylinder 62, the upper surface of ring 80 and the upper wall of channel 79 the rear wall of channel 79, the rear face of piston 80 and the annular series of grooves 83 in the lower surface of piston ring 80. Manifestly, with this arrangement, as the piston ascends its cylinder the contents thereof above the piston will be discharged into the piston cylinder beneath the piston through grooves 83, hence when the upper end 81 of piston 78 attains and is positioned in seat 70, the fluid contents of the piston cylinder (including air and a negligible amount of pipe-line seepage) which had been above the piston at the start of its upward movement will now occupy the cylinder below the piston to be subsequently dispelled therefrom into the valve chamber 38 on the downward stroke of piston 78 as will be hereinafter pointed out.

It will, therefore, be apparent that the piston 78 and the valve seats 70 and 73 control the valve stroke, since the valve block does not touch the top or bottom of the valve chamber and is loosely mounted therein, and when it is in closed position the pipeline pressure is on the movable disc valve 53 in seat closing direction and the valve block is in balanced or pressure equalized condition in said valve chamber 38.

Assuming valve block 43 to be in wide open position and the upper portion of piston 78 to be positioned in seat 70, as valve block 43 is started toward valve closing position and piston 78 toward its lower seat 73 piston ring 80 will be actuated to position the upper non-grooved surface thereof into contact with the upper adjacent wall of channel 79 thus effecting a seal so that the contents of the piston cylinder below the piston (including air and whatever pipe-line fluid may have leaked through the threaded area of the valve stem 48 and guide nut 72) will be expelled through said threaded area and discharged into the valve chamber, hence when the lower portion of piston 78 is positioned in piston or valve seat 73 and valve block 43 reaches completely closed position a vacuum will have been created in piston cylinder 62 and valve chamber 38 will be closed and sealed at its upper end. The creation of a vacuum above the piston in cylinder 62 will eliminate all resistance to the initial opening movement of valve block 43 and in fact will afford in conjunction with the pipe-line pressure exerted on the lower end of the valve block an auxiliary booster pressure to assist in the initial opening movement of the valve block. Moreover when piston 78 is seated in piston seat 73, all pipe-line pressure is removed from valve stem packing 67. This is also true when the valve block is in wide open position and the upper portion of the piston is seated in piston seat 70. Therefore, when the valve 43 is wide open or completely closed, the packing material 67 may be renewed by simply removing cap 69 and packing ring 66. The valve stem packing 67 is under full control, and no interruption or shut down to make any necessary leaky repairs is required, as in connection with other type valves. In this connection it will be noted that the pipeline fluid flow may be completely cut off when necessary, by the cut-off valve 84 mounted in the inlet pipe 6 in advance of valve chamber 38. It will also be noted when the upper portion 81 of piston 78 is in wide open position with its lower rounded apertured end above the fluid passages 6 and 7, a pocket will be formed which, as previously stated, is in communication with valve block chamber 38. Consequently the flow of the pipe-line fluid through passages 6 and 7 beneath this pocket will effect evacuation of valve chamber 38 with respect to residual pipeline fluid therein and to a lesser extent (because the suction action will be operative through the restricted threaded area of the valve stem and guide nut 72) said pipe-line flow will also serve to withdraw pipe-line fluid from the piston chamber 62, thus eliminating resistance to the closing movement of the valve.

While the operation of the device would seem to be clear from the above description, it might be well to further state that when the valve body structure A is operatively mounted on the pipeline B, in pipeline fluid passage closing position, the fluid under pressure will enter the aperture 52 of valve block 43 and into the auxiliary resiliently mounted movable disc valve 53 forcing it, in conjunction with spring 56, into sealing engagement with the valve seat 7, and thence through openings 58 and outwardly through aperture 49 into valve chamber 38 tending to upwardly raise said valve block, completely filling the chamber to the piston sealed valve seat 70 at the upper end, and equalizing the pressure on said valve block and imparting floatable characteristics thereto to render it non-sticking in closed position and easily movable to open position. The valve block 43 is moved in valve opening direction by actuation of the screw valve stem 48 by hand wheel 77 and as the valve block 43 moves upwardly in chamber 38 the piston 78 moves upwardly in chamber 62, and by the time said piston sealingly engages the upper valve seat 70 any possible chamber content has been ejected through the snap-ring valve stem or piston rod opening and through the bottom grooves 83 of said ring. By the reverse or downward actuation of the valve-stem piston-rod, the snap-ring 80 will engage the upper wall surface of piston channel or groove 79 and effect a seal with the wall of chamber 62, and when said piston has reached the limit of its downward movement in sealing engagement with the lower valve seat 73, all pipeline fluid pressure has been removed and shut off, leaving a vacuum in chamber 62 and the valve block 43 is in complete pipeline fluid cut-off position. At this point it might be noted that this bonnet structure and valve operative arrangement is especially adapted to the chemical industry, as well as other types of fluids, and also including large pipelines.

Method No. 1. To replace or repair a leaky valve it is only necessary to close the cut-off valve 84, remove the three bolts 85 connecting the bonnet structure C to the valve body structure A, and with the bonnet structure lift the valve stem with the valve block from the valve chamber 38, and as the valve block emerges from the chamber the auxiliary disc valve 53 will be expelled from the valve block by its compression spring 56, and all that is necessary is to replace it with a new one, and return the valve block, valve stem and bonnet to their normal positions in chamber 38 and operatively secure the connecting bolts 85 in place, the entire operation only requiring a few minutes.

Method No. 2. Under certain conditions, the quick repair of a leaky valve may also be effected by first closing the cut-off valve 84 in the inlet pressure fluid pipe section 6 of the pipeline B, then loosen or remove the bolts 36, or two of them and shift or drop down the end of pipe 11 with the thin washer-like member 13, or a short section of pipe 11 may be provided for removal with the washer, then remove the tubular valve seat 7 which permits the auxiliary disc-valve 53 with its spring 56 to be removed and replaced by a new one without disturbing the gate valve block 43, then replace valve seat 7 and pipe 11 with member 13, and replace the three bolts 36 in the clamping rings 20—32, tighten nuts 37 to effect a tight jointure of the pipe 11 and member 7, and which completes this operation.

Method No. 3. Under certain other conditions this "method" could be used: Close cut off valve 84, then loosen the valve inlet clamping ring bolts 30 about one fourth inch slack, then remove the outlet clamping ring bolts 36, first making sure the valve block 43 is in complete open position before doing so, then slide the valve body structure A back on pipe 6 and remove the valve seat 7, then bring the valve body A back to within about one fourth inch from the pipe 11, then move the valve block to its normal valve closing position and the auxiliary disk valve will be expelled by its spring, it then can be replaced with a new disk valve, and if necessary, assisted by means of a threaded rod tool (not shown) engageable in threaded opening 57 in knob 55 to compress the spring 56 to place the disk valve in position in the valve block, and then move the valve block slightly in opening direction to hold the disk valve in place, then move the valve body structure A forward on pipe 6 so that said pipe does not project into the valve chamber 38 beyond its inner wall surface to prevent the free sliding movement of the valve block 38 in the chamber and then reconnect all valve fittings.

The valve situation in connection with pipelines for the handling or transmission of fluids such as chemicals, oils, steam, gas, water and the like, have presented many problems and the valve structures heretofore in use have proved deficient in many respects such as the tendency of the valves to stick, and by reason of their construction not being easily repaired, thereby being short lived and requiring the installation of new valves. In many instances the well known types of valves are attached by being welded to the pipeline and rendering repairs not only extremely difficult but usually requiring the installation of new valves. Also by virtue of the valve construction they soon leak and repairs are very difficult to make, frequently requiring the pipeline to be shut down for the repair period. Further, the valve stem packing requires frequent replacement and likewise requiring an interruption or shutdown during the repacking operation. Particularly, in connection with the slidable valve type the valve is prone to stick, it frequently being impossible to move the valve from closed position, and rendering it necessary to remove the entire valve. However, this serious trouble has been overcome by the instant valve block and disc movable valve construction and arrangement, whereby the fluid pressure in said valve chamber is equalized on said valve block. Also in some valve structures the full volume fluid flow is restricted, whereas applicant's valve structure provides a full volume pipeline flow therethrough. Also, the structural arrangement of the instant valve provides uninterrupted service for long periods by reason of the low cost of maintenance resulting from the quick repair feature of a leaky valve which feature includes a valve block having an auxiliary disc valve mounted therein, the arrangement of the disc valve structure and valve block being such, that the leaky disc valve may be replaced in a few minutes.

Applicant has also provided a unique arrangement of a piston chamber, and piston within the chamber on the piston rod extending therethrough their construction and arrangement being such as to maintain the rod in perfect coincidence with the axis of the piston and valve chambers, including means within the piston chamber to limit movement of the rod or valve stem when moving upwardly to seal the piston chamber at its upper end and at the same time suspendingly position the valve block in complete open position in the valve chamber, and to seal the piston chamber at its lower end and coincidentally limit the downward movement of the rod to suspendingly position the valve block in the valve chamber in complete pipeline closing position, the valve block at no time being engageable with a valve seat.

The construction of the piston, piston ring and piston chamber being such that during the downward stroke of the piston rod the pipeline content is ejected and as the valve block reaches complete pipeline fluid cut-off position there is a vacuum in said piston chamber, so that there is no resistance therein during the upward stroke of the rod, and when the valve block is in either complete open or complete closed position the valve stem packing may be replaced without any hindrance and requiring no shut-down of the pipeline. Also, by virtue of the piston chamber and piston construction, during much of the time the device is in operation there is no fluid pressure on the valve packing, the life of the packing being greatly increased, and any operational interruption by reason of renewing the packing is entirely eliminated.

Also, the quick leaky valve disc repair feature which in a few minutes enables repairs to be effected, resulting from the construction and arrangement of the disc valve and its seats, whereby the movement of the disc valve with respect to its seats each time the valve is operated keeps the engageable surfaces of the valve evenly worn, tending to extend uninterrupted service over long periods and resulting in very low maintenance cost, and which latter is further enhanced by the detachable adjustable clamping ring structural arrangement with respect to the valve body and the connecting pipeline sections, whereby the entire valve structure can be removed quickly from the pipeline and as quickly operatively replaced. Further, said valve may be constructed of any suitable material including glass, stainless steel and the like, adapted to the particular use desired.

It will be apparent that the above referred to deficiencies, disadvantages and inherent problems, as above partially noted in connection with valves of this character heretofore in use have been overcome by the instant valve structure including the valve body stem portion, laterally extending fluid passage portions and the valve chamber intercepting the passage portions, the unique bonnet portion extending above the body portion and detachably mounted thereon, the valve stem being detachably connected to the valve block structure which includes its movable disc valve member. The structural arrangement of the piston chamber and structural arrangement of the piston and its vertical moveable piston ring and the construction of the valve chamber and piston in connection with the valve stem being such that, when moving in an upper direction the piston effects a seal as it engages the upper valve seat and at the same time suspendingly positions the valve block in fluid passage pipeline open position in the valve chamber and when moving in a downwardly direction removes all pipeline fluid content from the chamber and as the piston engages the lower valve seat the valve block is suspendingly positioned in pipeline fluid cut-off position in said valve chamber. Also, when the block is in fluid cut-off position the pressure fluid enters the valve block inlet aperture 52 into the movable disc valve 53 passing outwardly through apertures 58 into the block cavity and outwardly through aperture 49 into the lower end of the valve chamber 38 tending to force the valve upwardly and around said valve block, equalizing the fluid pressure thereon and imparting floatable characteristics thereto to overcome the sticking tendencies of the valve and effecting easy reciprocal movement of the valve in said chamber. Also, by virtue of the aligning tubular valve seat member 7, auxiliary disc valve 53, and valve block 43, each time the valve is operated the disc valve moves with respect to its engageable seats, thereby keeping the contacting surfaces evenly worn, resulting in longer periods of uninterrupted service and at a low maintenance cost, said valve assembly being simple in construction, manufacturable at a reasonable cost, easily installable, and efficient for the purposes intended.

Although in practice it has been found that the form of the invention illustrated in the accompanying drawings and referred to in the above description as the preferred embodiment is the most efficient and practical, yet realizing that conditions concurrent with the adoption of the invention will necessarily vary, it is well to emphasize that various minor changes in details of construction, proportion and arrangement of parts, may be resorted to within the scope of the appended claims without departing from or sacrificing any of the principles of the invention.

Having thus described my invention, what I desire protected by Letters Patent is as set forth in the following claims:

1. In a valve assembly a body structure sealed at its upper end, means for mounting said structure in a pipe-line constituting a conduit for a fluid under pressure, said body structure having aligned fluid inlet and outlet passages, a valve chamber intersecting said passages and having communication therewith, a valve block mounted within the chamber for movement therein and alternately operable into and out of fluid cut-off position relative to said fluid passages, means for directing the pipe-line fluid into said valve block for equalizing the pressure around said block, to effect easy floatable movement of the valve block within the chamber when subjected to pipe-line fluid pressure, means controlled by the movement of said valve block to seal said valve chamber when the valve block is in cut-off position relative to said fluid passages and to form a vacuum above the sealed valve chamber, said vacuum in connection with the pipe-line pressure serving to assist the initial movement of the valve block from fluid cut-off position.

2. In a valve assembly a sealed valve body structure, means for mounting said body structure in a pipe-line adapted to constitute a conduit for a pipe-line fluid under pressure, said body structure including aligned fluid passages, a valve chamber intermediate and in communication with said passages, said chamber being closed at its lower end, a valve block mounted within the chamber for movement therein and alternately operable into and out of fluid cut-off position relative to said fluid passages, means for directing the pipe-line fluid into said valve block and into said chamber to effect easy movement of the valve block within said chamber when subjected to pipe-line pressure, and means for sealing the upper end of the valve block chamber and creating a vacuum above said chamber, said means including a piston operable in connection with the movement of the valve block and means in connection with said piston to create a vacuum above the valve block chamber when the valve block is in cut-off position.

3. In a valve assembly, a valve body structure having an upper end and a pressure fluid passage at its lower end comprising portions extending beyond opposite sides of the body, one portion being a fluid inlet passage and the other an aligned fluid outlet passage, means for mounting said body structure in a pipe-line adapted to constitute a conduit for a fluid under pressure, a valve chamber closed at its lower end, said chamber intersecting said pressure fluid passage and having inlet and outlet openings in communication with said passage, a gate valve block slidable in said chamber said block including a movable auxiliary valve having in connection therewith resilient means for sealing the outlet passage opening, means in connection with said valve block and its auxiliary valve for equalizing the pipe-line pressure thereon to effect easy operation of said valve block in the chamber without sticking when subjected to fluid pressure, a bonnet structure adapted to close the upper end of said valve chamber said bonnet structure having a base adapted to fit on and to be connected to the upper end of said valve structure, a cylindrical piston chamber formed in said bonnet structure, a threaded valve stem or piston rod connected to the valve block and extending through said piston chamber, a piston on said rod and means in connection with said piston to seal the upper end of the valve block chamber and to create a vacuum above said piston to aid in the opening movement of the valve block.

4. A valve structure for a fluid under pressure comprising a valve body formed with aligned inlet and outlet fluid passages having their outer ends opening exteriorly of the body and their inner ends communicating with a valve chamber closed at its lower end, said chamber extending upwardly through the body in a plane normal to that of said fluid passages, a bonnet mounted upon the upper end of said body, means for mounting said valve body in a pipe line adapted to carry a fluid under pressure, a valve block positioned in said chamber, operating means connected with said valve block and accessible exteriorly of the bonnet to move said block to open and close positions with respect to said passages, said block including a movable disc valve, the construction and arrangement of said valve block and disc valve being such that fluid under pressure is directed into the valve block against the disc valve and into said valve chamber, whereby to actuate said disc valve into sealing relation with respect to said outlet passage, and to equalize fluid pressure in said valve chamber with respect to said valve block to effect easy operation of said valve block, a vaccum creating and valve chamber sealing assembly in said bonnet structure, said assembly including a piston cylinder, a piston in connection with said valve block operating means, said piston, operating in the piston cylinder and being provided with means to create a vacuum in said cylinder and seal the upper end of the valve block chamber when said valve block is moved to passage closing position, whereby to eliminate resistance to the opening movement of said valve block.

References Cited in the file of this patent

UNITED STATES PATENTS

| | | |
|---|---|---|
| 589,725 | Hodge | Sept. 7, 1897 |
| 866,440 | Denief et al. | Sept. 17, 1907 |
| 1,484,350 | Cusick | Feb. 19, 1924 |
| 2,081,021 | Smith et al. | May 18, 1937 |
| 2,286,623 | Kellaher et al. | June 16, 1942 |
| 2,668,685 | Ocker | Feb. 9, 1954 |

FOREIGN PATENTS

| | | |
|---|---|---|
| 566,958 | Great Britain | Jan. 22, 1945 |
| 578,237 | Great Britain | June 20, 1946 |